US010735574B1

(12) United States Patent
McDonald

(10) Patent No.: US 10,735,574 B1
(45) Date of Patent: Aug. 4, 2020

(54) UNIQUE CALL ALIAS ASSIGNMENT BETWEEN USER DEVICES

(71) Applicant: Captra App, LLC, Dallas, TX (US)

(72) Inventor: Jim McDonald, Dallas, TX (US)

( * ) Notice: Subject to any disclaimer, the term of this patent is extended or adjusted under 35 U.S.C. 154(b) by 0 days.

(21) Appl. No.: 16/278,631

(22) Filed: Feb. 18, 2019

(51) Int. Cl.
*H04M 1/2757* (2020.01)
*H04M 1/27457* (2020.01)
*H04W 88/02* (2009.01)

(52) U.S. Cl.
CPC ..... *H04M 1/2757* (2020.01); *H04M 1/27457* (2020.01); *H04W 88/02* (2013.01)

(58) Field of Classification Search
CPC ... H04M 15/61; G06Q 30/0236; G06Q 20/28; G06Q 30/04; H04W 4/24; H04W 4/12; G06F 3/04817
See application file for complete search history.

(56) References Cited

U.S. PATENT DOCUMENTS

| | | | |
|---|---|---|---|
| 7,602,894 B1 | 10/2009 | Shaffer et al. | |
| 7,729,685 B1* | 6/2010 | Chen | H04M 15/00 455/406 |
| 8,126,484 B2* | 2/2012 | Scott | H04W 48/08 455/466 |
| 10,097,685 B2 | 10/2018 | Sauln et al. | |
| 2007/0121863 A1 | 5/2007 | Nagel et al. | |
| 2008/0084982 A1 | 4/2008 | Chatterjee | |
| 2008/0187117 A1 | 8/2008 | Maugars | |
| 2008/0198987 A1 | 8/2008 | Daly | |
| 2011/0163848 A1 | 7/2011 | Shibata | |
| 2015/0066633 A1 | 3/2015 | Agrawal et al. | |
| 2015/0379562 A1 | 12/2015 | Spievak et al. | |
| 2016/0021518 A1* | 1/2016 | Martens | H04L 63/0407 455/466 |
| 2017/0013113 A1 | 1/2017 | Bendi et al. | |

* cited by examiner

*Primary Examiner* — Marisol Figueroa
(74) *Attorney, Agent, or Firm* — Emdadi Patent Law; Kamran Emdadi

(57) ABSTRACT

An example operation may include one or more of initiating a share operation, via a first mobile device, to share contact information with a second mobile device, identifying, via an application server, a first mobile device telephone number assigned to the first mobile device and a first alias telephone number to assign to the first mobile device, among available alias telephone numbers stored in a database associated with the application server, identifying, via the application server, a second mobile device telephone number assigned to the second mobile device and a second alias telephone number to assign to the second mobile device, among available alias telephone numbers stored in a database associated with the application server, and assigning the first alias telephone number to the first mobile device and the second alias telephone number to the second mobile device.

6 Claims, 12 Drawing Sheets

200

ACTUAL: XXX-XXX-1234
ALIAS:  XXX-XXX-1212

USER 'A' 102
USER 'A' DEVICE 104

ACTUAL: XXX-XXX-5656
ALIAS:  XXX-XXX-7575

USER 'B' DEVICE 108
USER 'B' 106

ACTUAL: XXX-XXX-1122
ALIAS:  XXX-XXX-2323

USER 'A2' 142
USER 'A2' DEVICE 144

ACTUAL: XXX-XXX-3434
ALIAS:  XXX-XXX-7878

USER 'B2' DEVICE 148
USER 'B2' 146

ACTUAL: XXX-XXX-6767
ALIAS:  XXX-XXX-2288

USER 'A3' 152
USER 'A3' DEVICE 154

ACTUAL: XXX-XXX-1818
ALIAS:  XXX-XXX-7575

USER 'B3' DEVICE 158
USER 'B3' 156

300

700

UNIQUE CALL ALIAS ASSIGNMENT BETWEEN USER DEVICES

TECHNICAL FIELD

This application generally relates to unique call alias number assignments, and more particularly, to assigning unique call alias numbers between different mobile devices.

BACKGROUND

Telephone numbers are uniquely assigned to mobile device users by their respective carriers. Certain users may desire to have alias numbers assigned to their mobile devices so those alias numbers can be shared with certain parties in an anonymous capacity. Ideally, each time a user desires telephone number anonymity with a contact, the user's device could be assigned a unique number that can be shared with that particular contact.

One common dilemma, is that the number of available alias numbers may be limited to a pool of available telephone number aliases. The result is certain user devices may be limited in the number of available aliases which can be assigned to various contacts while maintaining anonymity. The available numbers in the pool may quickly deplete since most common platforms assign a new number to each user for all assignment operations.

Data shared and received may be stored in a database which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. Furthermore, because a database storage system has minimal to no data redundancy, data that is unexpectedly lost is very difficult to retrieve other than through manual operation from back-up storage. Conventionally, a centralized database is limited by its ability to prevent fraudulent claims made by entities attempting to submit multiple claims for a single occurrence. Information that is important, such as user permissions and private user data may require further data management infrastructure and procedures to ensure privacy and consent to share such data is preserved.

SUMMARY

One example embodiment may provide a method that includes one or more of an example operation may include one or more of initiating a share operation, via a first mobile device, to share contact information with a second mobile device, identifying, via an application server, a first mobile device telephone number assigned to the first mobile device and a first alias telephone number to assign to the first mobile device, among available alias telephone numbers stored in a database associated with the application server, identifying, via the application server, a second mobile device telephone number assigned to the second mobile device and a second alias telephone number to assign to the second mobile device, among available alias telephone numbers stored in a database associated with the application server, and assigning the first alias telephone number to the first mobile device and the second alias telephone number to the second mobile device.

Another example embodiment may include a system that includes an application server, and a first and second mobile device, the first mobile device is configured to initiate a share operation to share contact information with the second mobile device, the application server is configured to identify a first mobile device telephone number assigned to the first mobile device and a first alias telephone number to assign to the first mobile device, among available alias telephone numbers stored in a database associated with the application server, identify a second mobile device telephone number assigned to the second mobile device and a second alias telephone number to assign to the second mobile device, among available alias telephone numbers stored in a database associated with the application server, and assign the first alias telephone number to the first mobile device and the second alias telephone number to the second mobile device.

Yet another example embodiment may provide a non-transitory computer readable storage medium configured to store instructions that when executed cause a processor to perform one or more of initiating a share operation, via a first mobile device, to share contact information with a second mobile device, identifying, via an application server, a first mobile device telephone number assigned to the first mobile device and a first alias telephone number to assign to the first mobile device, among available alias telephone numbers stored in a database associated with the application server, identifying, via the application server, a second mobile device telephone number assigned to the second mobile device and a second alias telephone number to assign to the second mobile device, among available alias telephone numbers stored in a database associated with the application server, and assigning the first alias telephone number to the first mobile device and the second alias telephone number to the second mobile device.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide a communication information management (CIM) application that is used to share contact information from one user device to another. In one example, the first user/initiator, such as a calling party or 'A' user may share contact information, via an information sharing application operated by an 'A' user device, with another user device, such as a recipient device or 'B' user device. The CIM application may then initiate a sharing operation that identifies user 'A's assigned telephone number and user 'B's assigned telephone number. User 'A' may identify the sharing operation as an anonymous sharing event which invokes an alias number assignment being performed by the information sharing application or communication information application (CIM) as identified in the example of FIG. 1A. In general, the CIM application operates in a device agnostic manner, as the profile information of the users' may be identified prior to engaging any alias number assignments or recalling previous number assignments from memory.

Figure 1A:
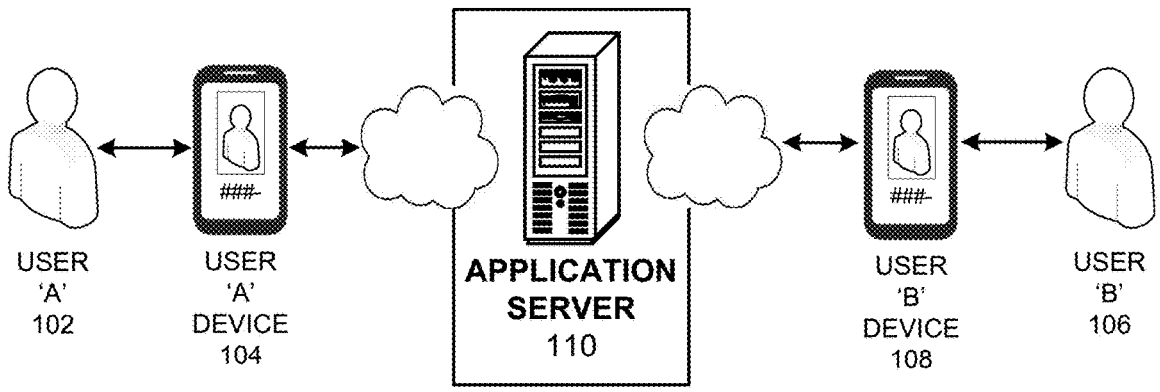
FIG. 1A illustrates a system diagram of a user device sharing alias contact information with another user device, according to example embodiments.
Figure 1A:
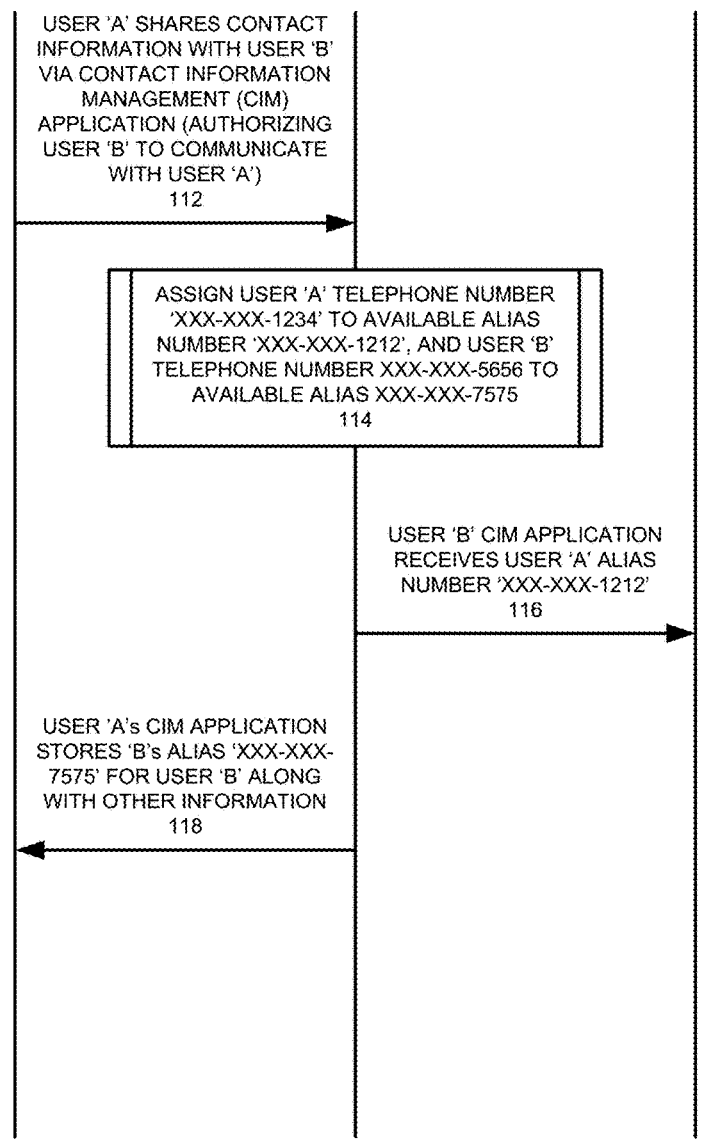

FIG. 1A illustrates a system diagram of a user device operating a CIM application which shares alias contact information with another user device, according to example embodiments. Referring to FIG. 1A, the configuration 100 provides an 'A' user 102 operating a mobile device 104. The initial operation may be to share contact information with a 'B' user operating a 'B' user device 108 operated by a 'B' user 106. The device 104 may operate a contact information management (CIM) application which communicates with a remote application server 110 to communicate and establish relationships other user devices via an anonymous telephone number assignment configuration. In operation, when a request to share contact information with another user device 108 is received 112 from a first user device 104, the CIM application operating on the user device 104 and the application server 110 will then use the share message received to effectively authorize user 'B' 106 to communicate with user 'A' using the CIM application service, and then identify the user device 104 by telephone number XXX-XXX-1234, which is the actual telephone number assigned to the user device 104. The application server 110 will then identify an available alias which can be assigned 114 to the user 'A' 102 for a semi-permanent arrangement between user 'A' 102 and another user 106. The semi-permanent relationship represents an ongoing assignment and relationship for the duration of the subscription of 'A' to the CIM application. The assignment of alias numbers to user 'A' are maintained throughout the duration of the subscription of user 'A' to the CIM application service. If user 'A's subscription is terminated, then the associations between aliases are revoked. This would enable one particular reassignment scenario where a previously assigned alias number could be reassigned to another user, however, other reassignment scenarios may not require a previous user to be revoked. The CIM application will also assign an available alias to user 'B' 106. This example provides that as long as user 'A' 102 desires to have a profile accessible via their CIM application profile, affiliated with another user profile, such as user 13', under a particular alias, then the relationship will be maintained for the foreseeable future until the relationship is revoked. This relationship includes the alias numbers assigned to both parties via the CIM application.

The alias that is assigned by the application associated with the user 'A' 102 and the corresponding device 104 is XXX-XXX-1212, which is assigned for the relationship with user B 106. The alias assigned to user 'A' can then be assigned to all subsequent invitee users or 'B' users (B1, B2 . . . BN), and all those 'B' users will receive the same caller identification number (i.e., A's alias: XXX-XXX-1212) from that user 'A'. As a result, the application server 110 may store a pair of numbers, a tuple and/or a quadruple of numbers as a particular entity relationship. For example, XXX-XXX-1234, user 'A's actual number, may be paired with the alias number XXX-XXX-1212 and stored as a number pair in a database associated with the application server 110. Additionally, the alias number XXX-XXX-1212 may be also paired with user B's actual number XXX-XXX-5656 assigned to user B's device 108. The tuple of numbers XXX-XXX-1234, XXX-XXX-1212 and XXX-XXX-5656 may be stored as a relationship between user 'A's profile and user 'B's profile in the CIM application. Responsive to the alias assignment of A's number (1234) with A's alias number (1212), the application may also select another available number to assign in place of B's number (5656), as an alias number for user B (i.e., 7575). This creates a data quadruple identifier which identifies four pieces of information when routing a call/message between A and B. The quadruple of numbers includes XXX-XXX-1234 aliased with XXX-XXX-1212 and XXX-XXX-5656 aliased with XXX-XXX-7575, which may be stored as a relationship between user 'A's profile and user 'B's profile in the CIM application. As a result, when an account profile identified by the CIM application is attempting to call or message user profile 'B', the initiator user (A), in this case, will be identified as having a number assigned to their profile, such as their device number and an alias assigned to their profile. The alias can be used as the initiator address when sending a call or message to user B.

In one example, each time user 'A', via a device 104 dials/messages user 'B's profile and/or device 108, the CIM application will identify 'A's real number XXX-XXX-1234, then A's assigned alias XXX-XXX-1212 as being linked to the number that was dialed (i.e., XXX-XXX-5656), the record in a database managed by the application server 110 will be referenced to retrieve the record. The record will be referenced to identify whether an association is stored which includes A's real number, A's alias number, B's real number and B's alias number (i.e., the quadruple data identifier parameter). Then, the call/message will be forwarded to user B's device 108 and identified by the contact information application and/or CIM application 116 operating on user 'B's device (assuming that B's device is using the CIM application—not required). The first time the communication is received at B's device, the contact information application being used by 'B's device 108 to identify user 'A' may store the alias number XXX-XXX-1212 identifying user 'A's device in a contact menu option 118. Other information may be stored as well, such as title, location, relationship type, date, suggested contact date, purpose of association, etc. Before user 'A' communicates with user 'B', the CIM application may assign both aliases to both parties so neither party has a chance to identify and store either party's actual number. The CIM application performs the alias assignment contemporaneously to provide an anonymous communication link identified by the users' profiles and contact information. Only the application server 110 has a record of both parties actual telephone numbers, which are used for communication routing.

In one example, user B's device 108 may also be utilizing the CIM application, which then may attempt to assign B's device 108 an alias as well, however, if user A has already linked to user B via the CIM application, then B's actual number may have already had an assigned alias. The CIM application operating on each user's device could attempt to forward contact information to A's device 104 from B's device 108, after the relationship was created by A's device 104 by sharing contact information with B's device 108 via the CIM application. In this event, B's returned shared information may overwrite the previous information via the CIM application once an alias is identified and assigned for user B (i.e., XXX-XXX-7575). However, user 'A' may still have 'B's original contact information thus the attempt to anonymize B's information may not be entirely successful. However, if user B shared an alias with user A in the first place, then the anonymization of both parties could be achieved if both parties were using the CIP application.

Figure 1B:
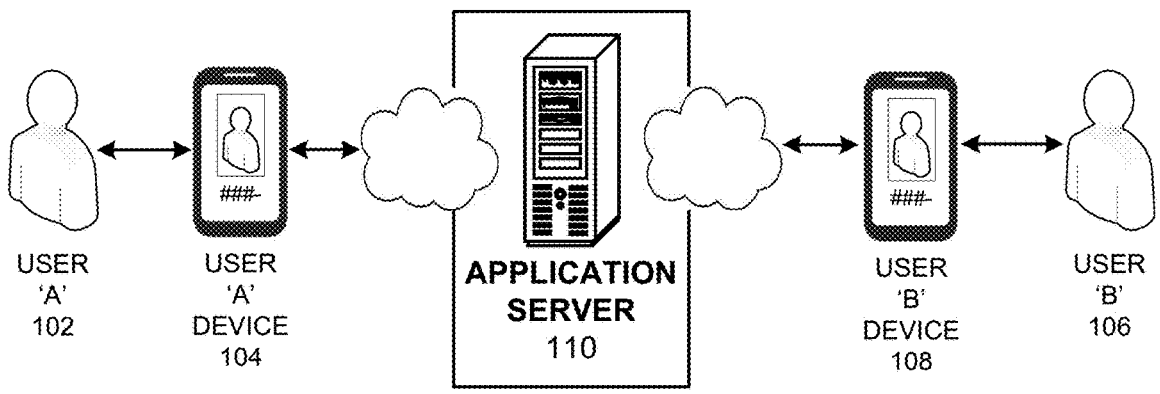
FIG. 1B illustrates a system diagram of the other user device establishing a communication session with the user device, according to example embodiments.
Figure 1B:
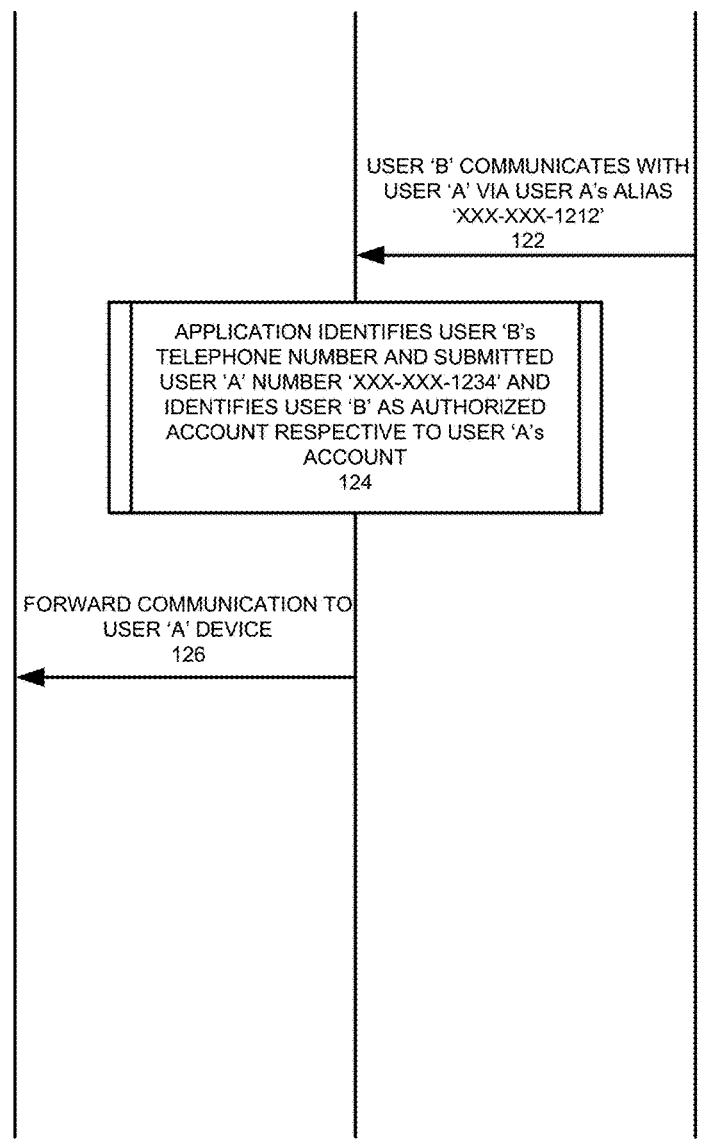

FIG. 1B illustrates a system diagram 120 of the other user device establishing a communication session with the user device, according to example embodiments. Continuing with the same example, user 'B' 106 may then attempt to communicate with user 'A' after the setup of the alias number in 'B's contact list. In this example, user 'B' may attempt to communicate (dial/message) 122 with user 'A' via user 'A's alias 122 via the CIM application, which identifies user 'B's number and/or alias number, if assigned, then the dialed number (A's alias number) and the association in the database of the server, which has the number pair (A's numbers) or number quadruple (A's numbers and B's number) stored in memory, which enables the call to be routed from B's number to A's alias and then to A's actual telephone number while maintaining anonymity. The registered account/profile for user 'A' may be used to determine whether user 'B' is an authorized account 124 respective to user 'A', which is then identified and used by the CIM application to forward the communication 126 anonymously from 'B' to 'A'.

The CIM application may select a unique alias number from a collection of reserved phone numbers (i.e., number pool) and perform an association between the users (initiator 'A' and recipient 'B'). When a recipient, such as 'B' 106 attempts to communicate (calls/texts) to an assigned alias such as A's alias XXX-XXX-1212, the application routes the communication to user device 104 via B's actual number and B's alias as the assigned number identifier, and by using A's actual number and the alias assigned to 'A' for assigned number identification, via the database associations between numbers of the data quadruple stored in the application server 110. In another example, different recipients other than just recipient 'B' which are associated with CIM application user 'A', will continually identify user 'A' via user 'A's assigned telephone number alias. Upon saving such contact record information in their respective contact information records, each CIM application user will have a unique alias number assigned to their account which is associated with each recipient associated with their CIM account. Alias numbers will be uniquely assigned per recipient respective to a particular user, such as user 'A', who will use the same alias for other recipients as an initiator of the contact information via the CIM application, however, alias numbers may be re-used more than once for other recipients (B users) associated with other initiators (A users).

Figure 1C:
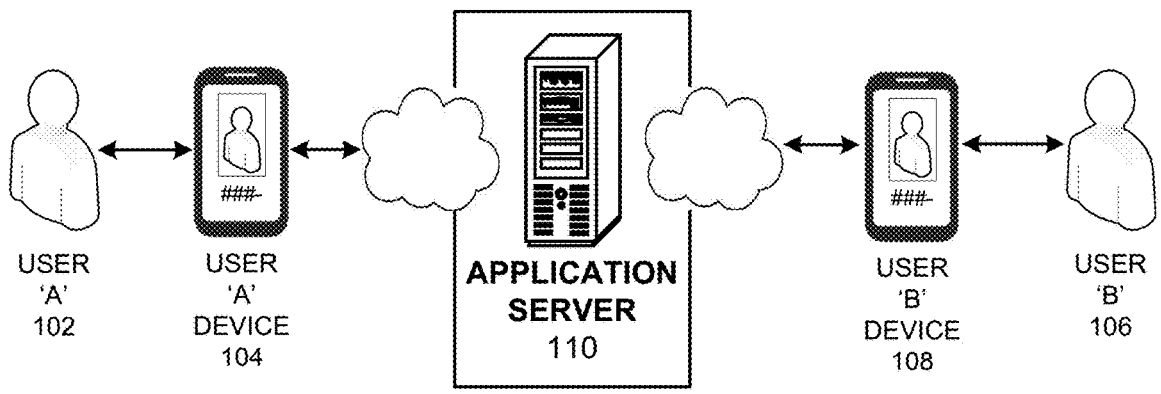
FIG. 1C illustrates a system diagram of the user device establishing a communication session with the other device, according to example embodiments.
Figure 1C:
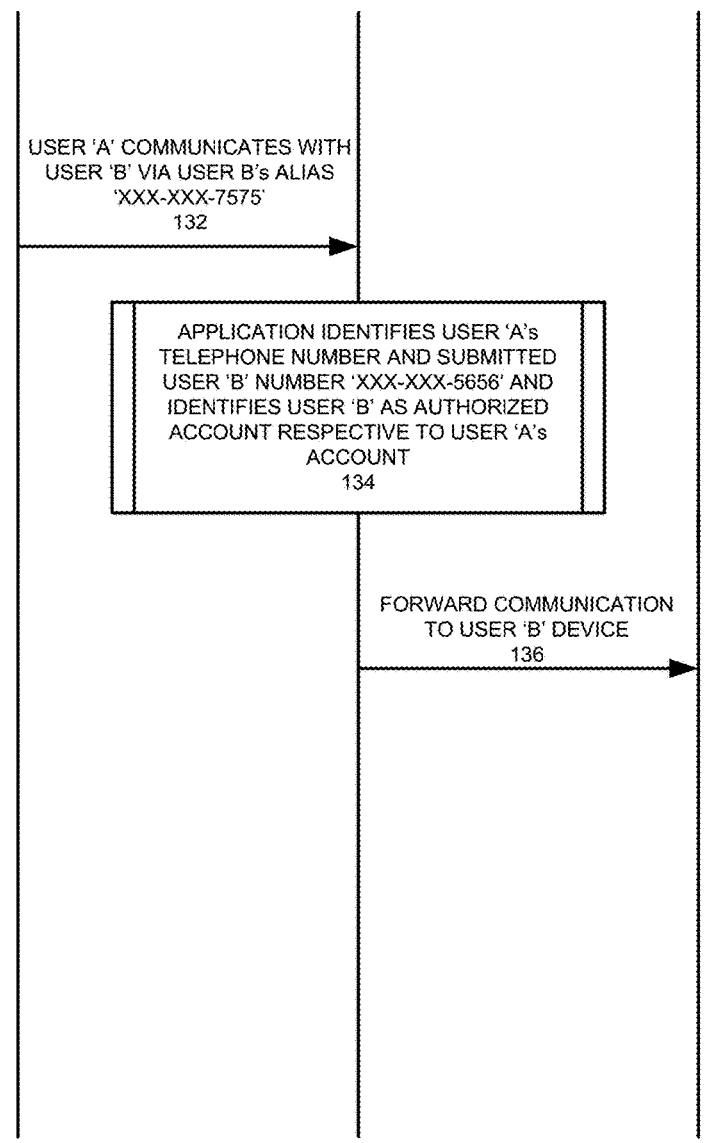

FIG. 1C illustrates a system diagram of the user device establishing a communication session with the other device, according to example embodiments. Referring to FIG. 1C, the system configuration 130 may include another example where the original user attempts to communicate with the previously assigned contact. In this example, the user 'A' may communicate 132 with user 'B' via user 'B's alias XXX-XXX-7575. The application of the CIM may identify user 'A's telephone number and user 'B's number XXX-XXX-5656 and then identify user 'B' as the authorized account respective to user 'A's account 134. The association may include retrieving user 'A's profile responsive to identifying the communication attempt, identifying all of user 'A's contacts which are stored in the profile, identifying user 'B' as an authorized contact based on the number dialed by user 'A', then routing the call/message 136 to user 'B' using 'B's real number for routing purposes.

Figure 2:
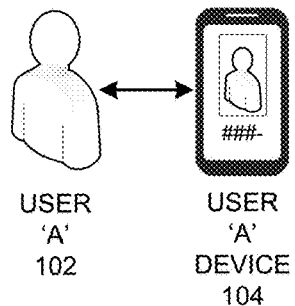
FIG. 2 illustrates an association diagram of various associations managed by the CIM application, according to example embodiments.
Figure 2:
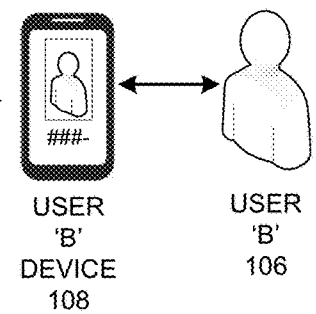
Figure 2:
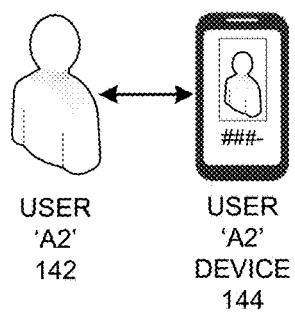
Figure 2:
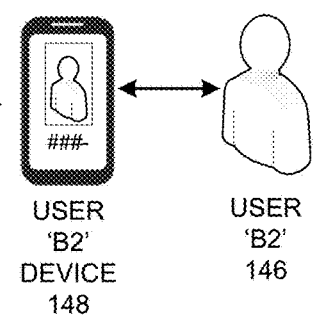
Figure 2:
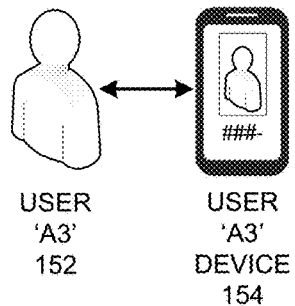
Figure 2:
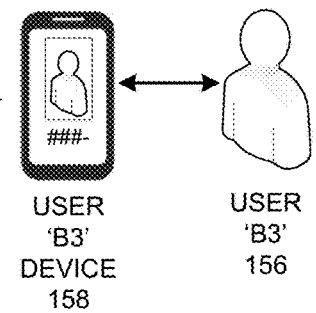

FIG. 2 illustrates an association diagram of various associations managed by the CIM application, according to example embodiments. Referring to FIG. 2, the assignment example 200 provides user 'A' establishing a relationship with user 'B' as indicated in the example of FIG. 1A. User 'A' may also establish a new relationship with user 'B2' 146 by communicating with the CIM application and user 132's device 148. In this case, the alias assigned to 'B2' may be XXX-XXX-7878, where the X values represent any number and the last four digits are selected from a pool of available numbers, and 'B2's actual number may be XXX-XXX-3434. Another user 'A2' 142 may have an actual number of XXX-XXX-1122 assigned to 'A2' and used by 'A2's device 144 and an alias of XXX-XXX-2323 when the CIM application is used to establish a new relationship with user 'B2', which may have the same or a different alias. In yet another example, another user 'A3' 152 may have an actual number of XXX-XXX-6767 and an alias of XXX-XXX-2288 which is assigned when 'A3' attempts to share contact information with another user 'B3' 156 using device 158, with an actual number of XXX-XXX-1818 and an alias that is assigned to be XXX-XXX-7575. It is important to note that the alias assigned to 'B3' and used by 'A3' has been reused/recycled concurrently with the same alias assigned to user 'B'. In this case, there is no conflict, since the associations are unique between originators and invitees, for example, 'A3' 152 has no relationship with user 'B' 106, and thus the reuse of XXX-XXX-7575 is not a conflicted relationship among the various users of the CIM application.

Figure 3A:
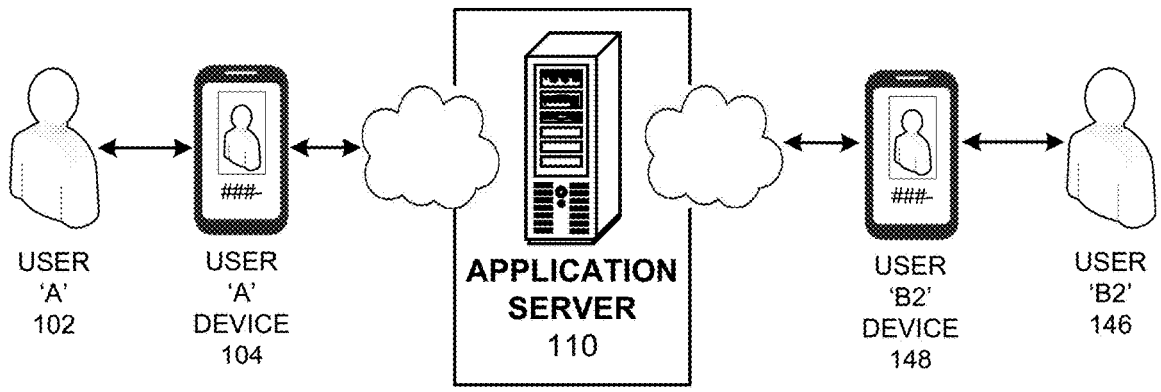
FIG. 3A illustrates a system diagram of the user device establishing a communication session with a new user device, according to example embodiments.
Figure 3A:
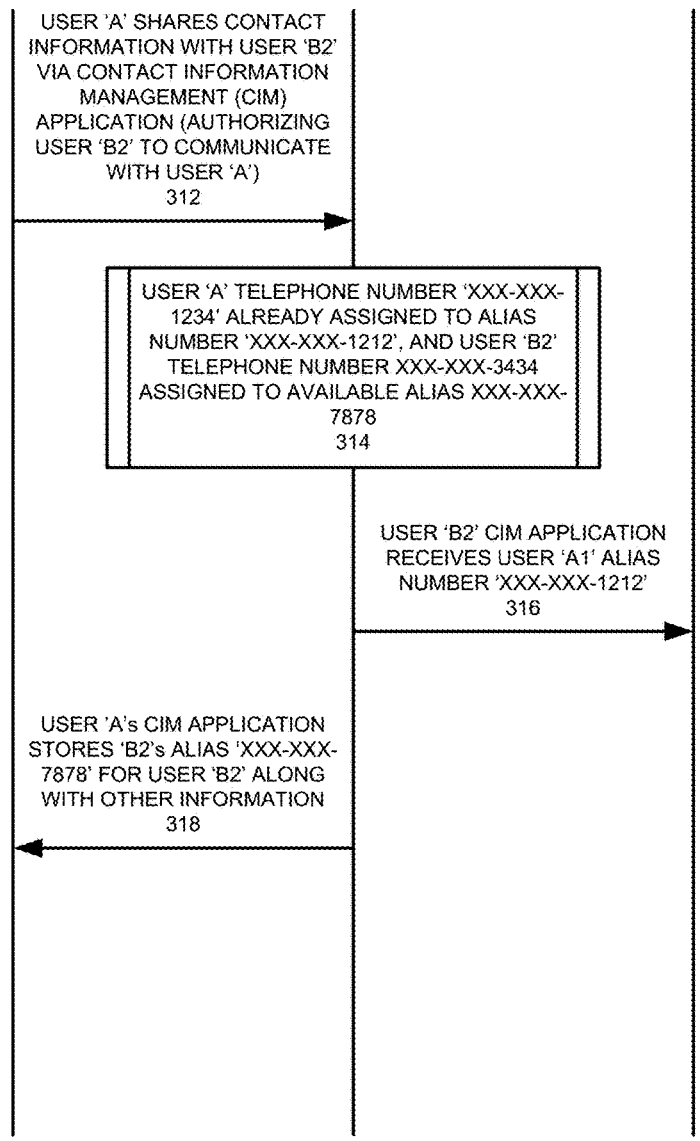

FIG. 3A illustrates a system diagram of the user device establishing a communication session with a new user device, according to example embodiments. Referring to FIG. 3A, the example 300 provides a same user 'A' 102 establishing a relationship with a new user 'B2' 146. In this example, user 'A' 102 has already received an alias number. The user 'A' may share contact information with user 'B2' 146 via their respective devices 104/148. The CIM application receives the request to share information 312 and authorizes 'B2' to communicate with user 'A'. The CIM application will then link user 'A's alias number to an alias for user 'B2'. The actual number for 'B2' may be XXX-XXX-3434 and the alias which is assigned 314 to 'B2' will be XXX-XXX-7878, which is different from the alias assigned to user 'B'. Since 'A' has a relationship with 'B' and 'B2', the number assigned to 'B2', and to be used by 'A' is different from the alias number assigned to 'B'. The user 'B2' 148 can then store contact information for user 'A', and user 'A' can store contact information 318 for user 'B2' 146.

Figure 3B:
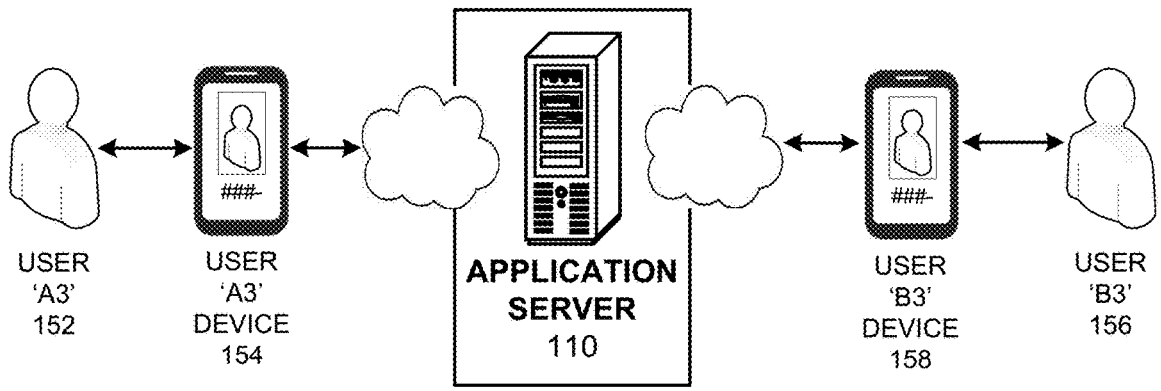
FIG. 3B illustrates a system diagram of another new user device establishing a communication session with another new user device, according to example embodiments.
Figure 3B:
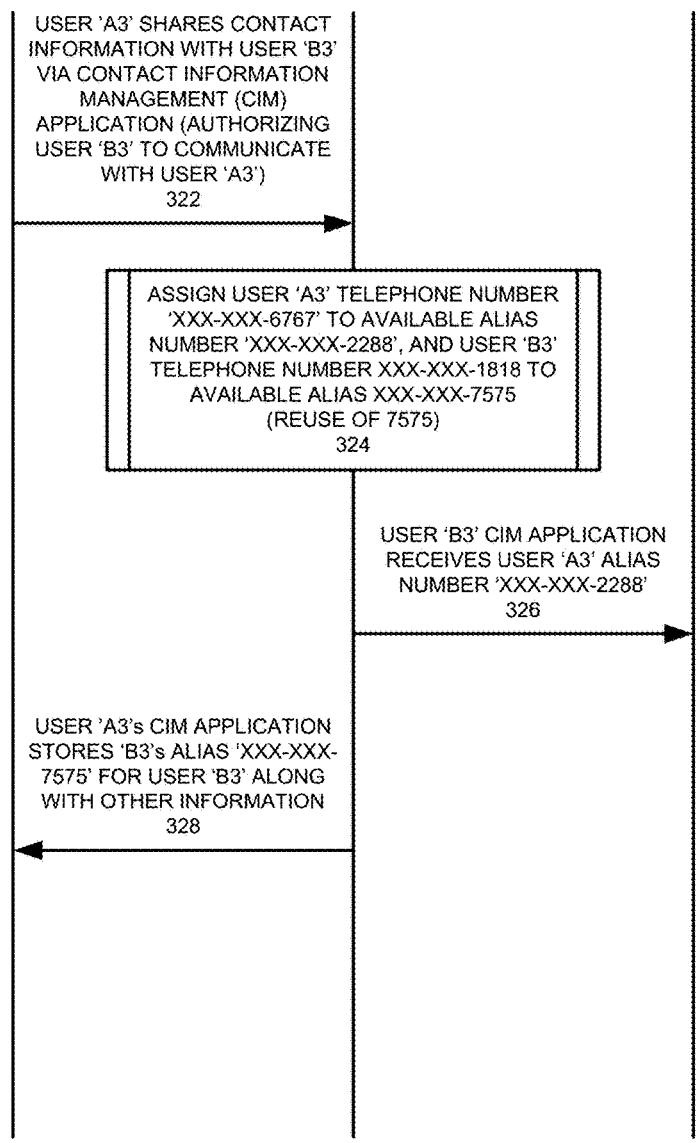

FIG. 3B illustrates a system diagram of another new user device establishing a communication session with another new user device, according to example embodiments. Referring to FIG. 3B, the example 320 provides a new user 'A3' 154 establishing a relationship with a new user 'B3' 158. In this example, user 'A3' 152 has not received an alias number but will be assigned one, such as XXX-XXX-2288 that is identified with 'A3's real number XXX-XXX-2288. The user 'A3' may share contact information with user 'B3' 156 via their respective devices 154/158. The CIM application receives the request to share information 322 and authorizes 'B3' to communicate with user 'A3'. The CIM application will then link user 'A3's alias number to an alias assigned for user 'B3'. The actual number for 'B3' may be XXX-XXX-1818 and the alias which is assigned 324 to 'B3' will be XXX-XXX-7878, which is different from the alias assigned to user 'B2', however, the alias is the same as the alias assigned to 'B'. Since there is no conflicting relationships between originator parties ('A' parties) and invitee parties ('B' parties), the alias XXX-XXX-7878, may be reused, and assigned as an active alias along with the same number XXX-XXX-7878 as an active alias assigned to 'B'. Since 'A3' has no relationship with 'B' and 'B2', the alias number assigned to 'B3' and to be used by 'A3' is the same as the one used by 'B'. The user 'B3' can then store contact information 326 for user 'A3', and user 'A3' can store contact information 328 for user 'B2'.

Figure 4:
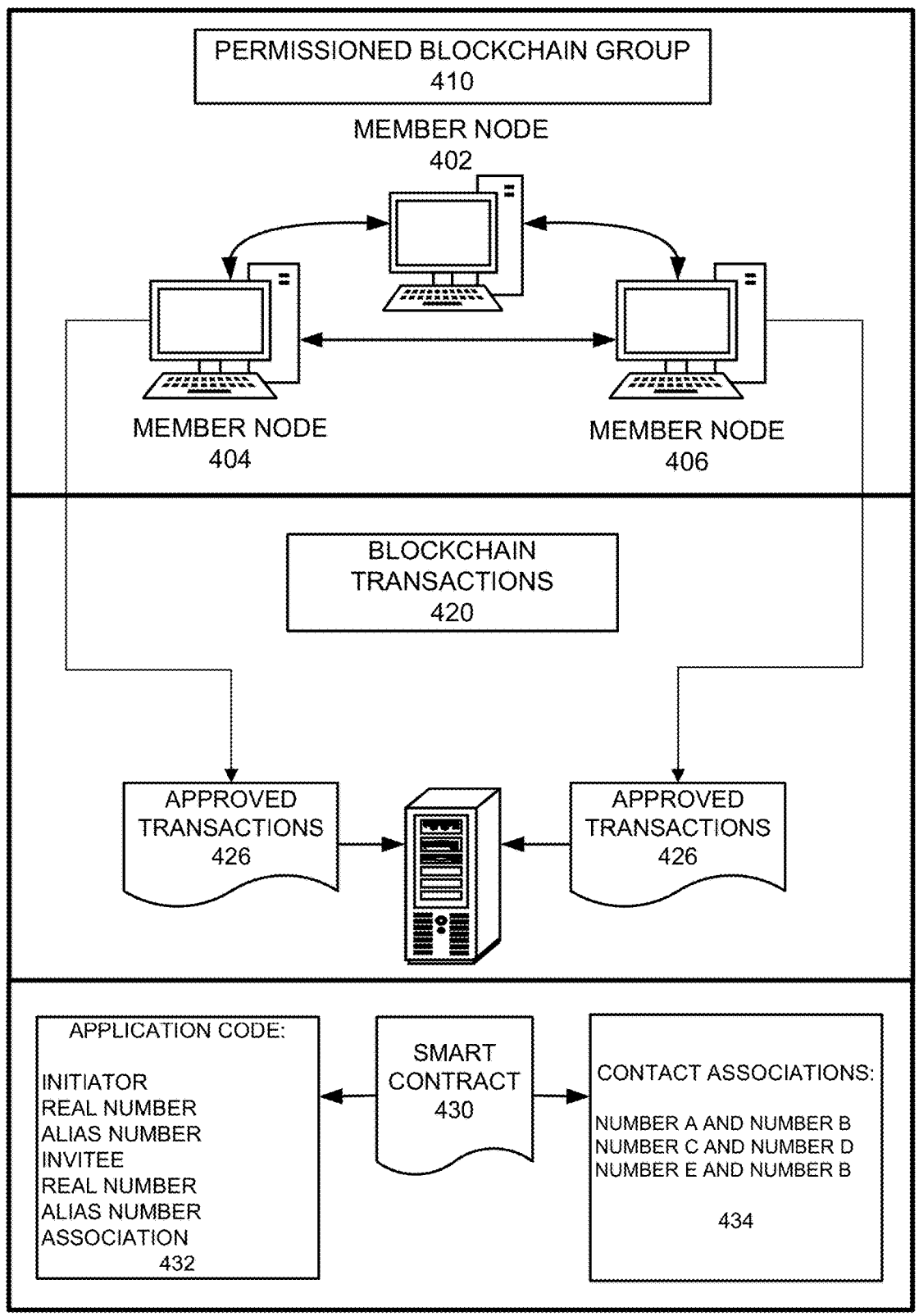
FIG. 4 illustrates a blockchain configuration setup to conduct transactions for the user associations using the CIM application, according to example embodiments.

FIG. 4 illustrates a blockchain configuration setup to conduct transactions for the user associations using the CIM application, according to example embodiments. Referring to FIG. 4, the logic configuration 400 may include certain blockchain elements, for example, a group of blockchain member nodes 402-406 as part of a permissioned blockchain group 410. The permissioned blockchain is not accessible to all parties but only to those members with permissioned access to the blockchain data. The blockchain nodes may include one or more nodes. The nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain authentication and seek to write to a blockchain immutable ledger stored in the blockchain, a copy of which may also be stored on the underpinning physical infrastructure.

The blockchain transactions 420 are stored in memory of computers as the transactions are received and approved by the consensus model dictated by the members nodes. Approved transactions 226 are stored in current blocks of the blockchain and committed to the blockchain via a committal procedure which includes performing a hash of the data contents of the transactions in a current block and referencing a previous hash of a previous block. Within the blockchain may be smart contracts 430 which are configured to define the terms of transaction agreements and actions included in the smart contract executable application code 432. The information used to create and establish alias number relationships may be based on information sharing agreements to include permissions granted to share alias telephone numbers by the CIM. In general, the information may include the initiator's number, alias number, the invitee's number, alias number and other association information 434, such as the type of relationship (i.e., friends, business, etc.) and other information, such as tags, titles, or other information useful to the relationship parties, etc.

The blockchain configuration may include one or more applications which are linked to application programming interfaces (APIs) to access and execute stored program/ application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code provides a basis for the blockchain transactions by establishing application code which when executed causes the transaction terms and conditions to become active. The smart contract 430, when executed, causes certain approved transactions 426 to be generated, which are then forwarded to the blockchain platform. The platform includes a security/authorization, computing devices which execute the transaction management and a storage portion as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIG. 4 may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., virtual machines) included in the blockchain layer. The result may include a decision to reject or approve the transaction based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 5A:
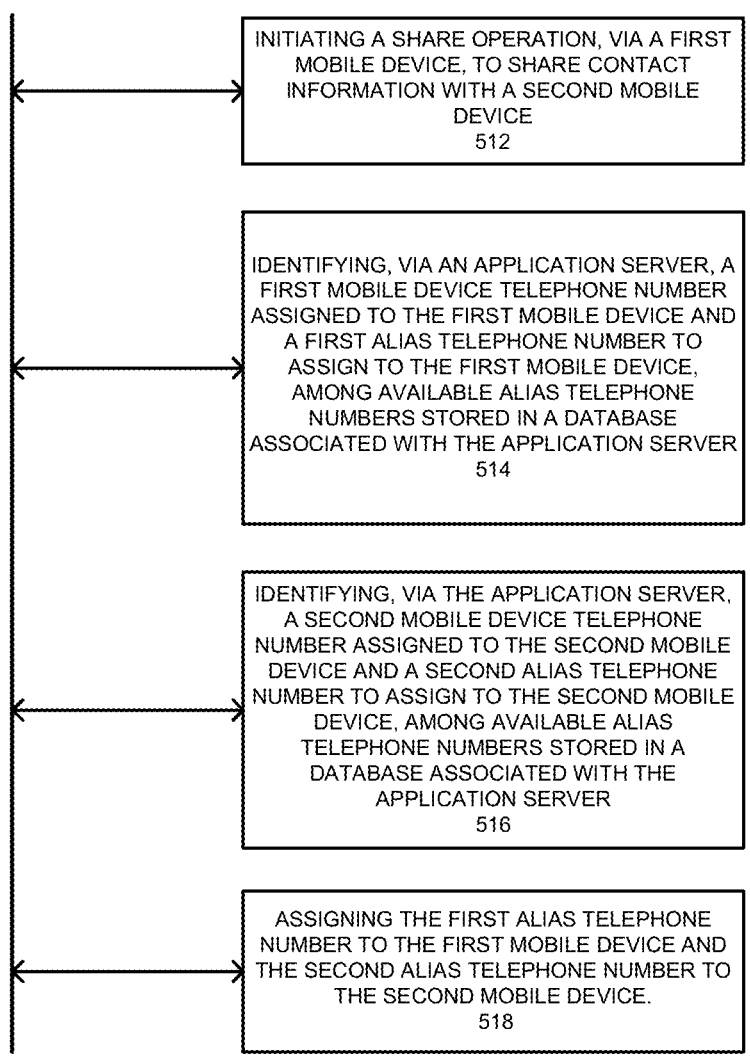
FIG. 5A illustrates an example method of operation for assigning alias numbers to user devices, according to example embodiments.

FIG. 5A illustrates an example method of operation for assigning alias numbers to user devices, according to example embodiments. Referring to FIG. 5A, the method 500 may include initiating a share operation, via a first mobile device, to share contact information with a second mobile device 512, identifying, via an application server, a first mobile device telephone number assigned to the first mobile device and a first alias telephone number to assign to the first mobile device, among available alias telephone numbers stored in a database associated with the application server 514, identifying, via the application server, a second mobile device telephone number assigned to the second mobile device and a second alias telephone number to assign to the second mobile device, among available alias telephone numbers stored in a database associated with the application server 516, assigning the first alias telephone number to the first mobile device and the second alias telephone number to the second mobile device 518.

The share operation causes a share message to be sent to the second mobile device, and the share message authorizes the second mobile device to communicate with the first mobile device. The method may also include creating a first association data identifier which includes the telephone number of the first mobile device and the first alias telephone number, and creating a second association data identifier which identifies the telephone number of the second mobile device and the second alias telephone number, and storing the association identifiers in the database associated with the application server. The method may also include identifying, at the application server, a communication request, from the second mobile device, which identifies the first alias telephone number, retrieving the association identifiers from the database, determining the first alias telephone number is assigned to the first mobile device, and establishing a communication session between the first mobile device and the second mobile device. The method may also include identifying a subsequent share operation sent via a third mobile device, the share operation being destined for a fourth mobile device, and assigning a third alias telephone number to the third mobile device and a fourth alias telephone number to the fourth mobile device. In this example, the fourth alias telephone number is the same as the second alias telephone number. The method may also include creating a third association data identifier which includes the telephone number of the third mobile device and the third alias telephone number, and creating a fourth association data identifier which identifies the telephone number of the fourth mobile device and the fourth alias telephone number, and storing the third and fourth association identifiers in the database, wherein the fourth association identifier identifies the fourth alias telephone number assigned to the fourth mobile device as being the same as the second alias telephone number assigned to the second mobile device, both of which are stored simultaneously in the database.

Figure 5B:
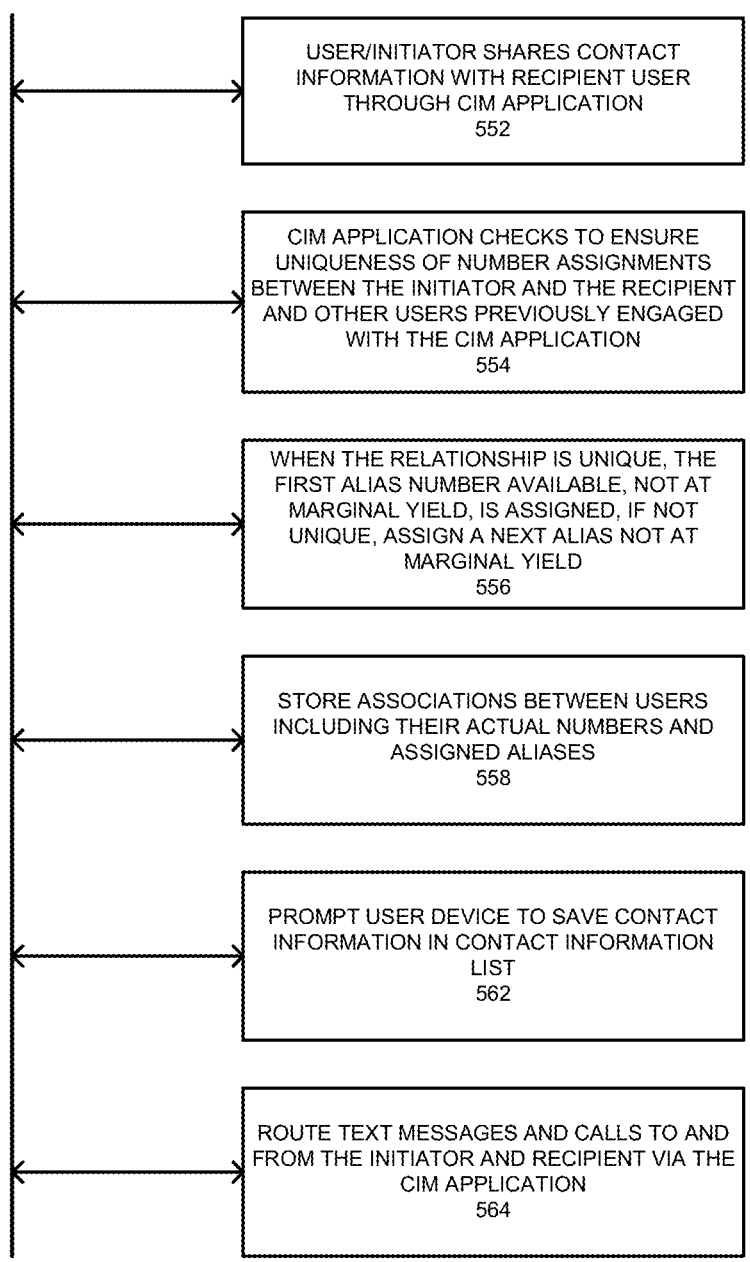
FIG. 5B illustrates another example method of operation for assigning alias numbers to user devices, according to example embodiments.

FIG. 5B illustrates another example method of operation for assigning alias numbers to user devices, according to example embodiments. Referring to FIG. 5B, the example 550 provides a method that includes the user/initiator sharing contact information with a recipient user device through the CIM application 552. The CIM application checks to ensure uniqueness of number assignments between the initiator and the recipient relationship by identifying other users previously engaged with the CIM application 554. If the number assignment relationship is unique the assignment may occur. The first alias number selected may be checked for its respective marginal yield, and if the marginal yield of a particular alias number is not at its peek or expected marginal yield, then that number alias may be assigned 556. If the relationship of numbers is not unique and already exists, then a next number will be selected that is not at its marginal yield. The marginal yield may be based on a yield determination that requires a number to be selected based on a particular yield for that number. For example, if 10 numbers are available and the first number is only associated in five instances throughout the application's history and usage records, among two unique users in each instance, and the application determines that the optimal yield is 20, then that number can be used until the optimal yield is reached as a threshold value. As the aliases are assigned, the associations between the users based on their actual and alias number records, are stored 558 in memory for reference and communication purposes. The user device may be prompted to save the contact information in a contact information list 562. The text messages/calls are then routed via the CIM application to and from the initiator and the recipient 564 by using the aliases and keeping the actual numbers private and inaccessible from the users to maintain anonymity.

Figure 6A:
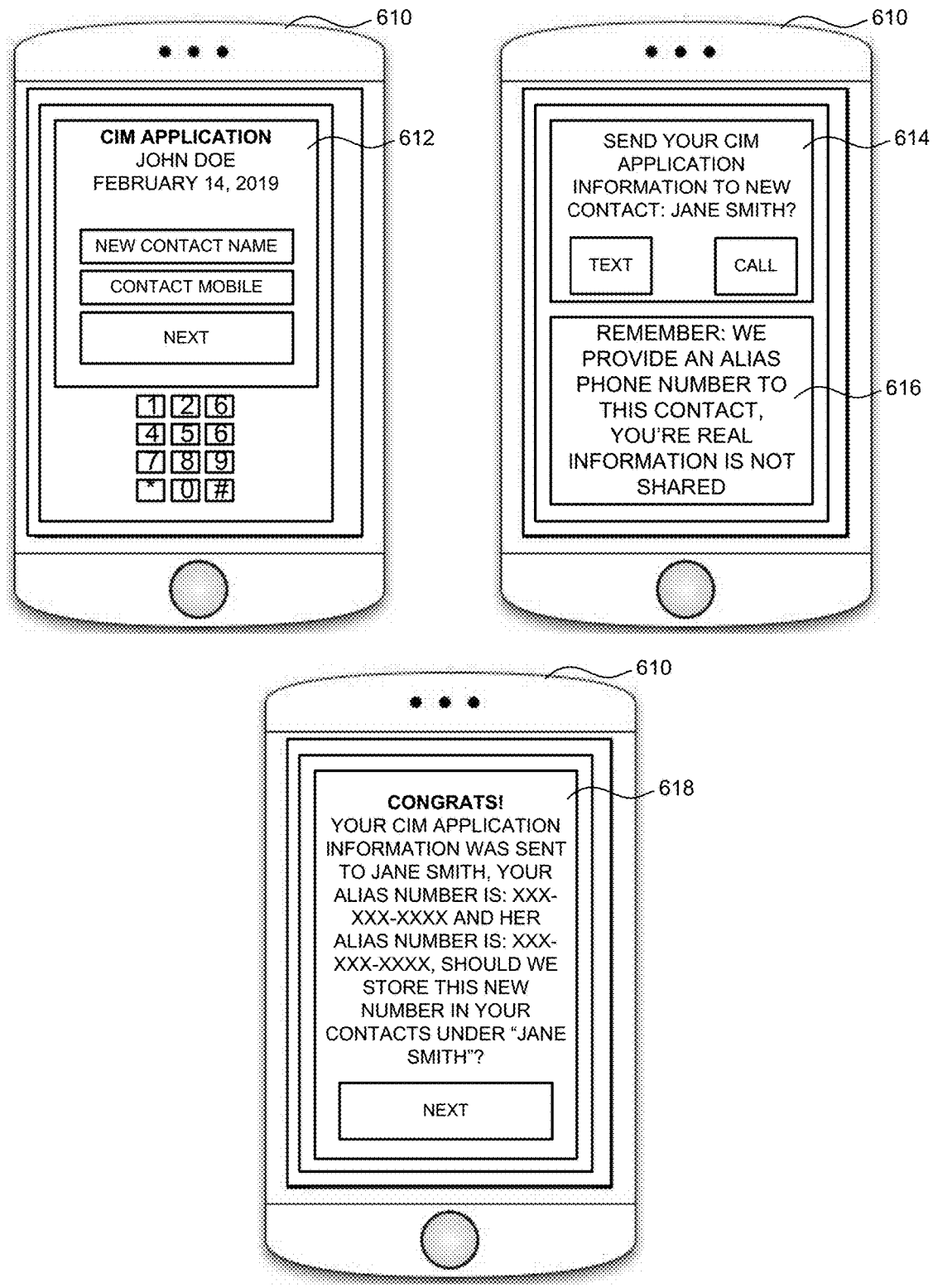
FIG. 6A illustrates an example user interface of an originator user device accessing the CIM application and communicating between the originator and recipient user device, according to example embodiments.

FIG. 6A illustrates an example user interface of an originator user device accessing the CIM application and communicating between the originator and recipient user device, according to example embodiments. Referring to FIG. 6A, the example 600 provides user interfaces of the initiator's mobile device 610. Initially, the initiator may access the application main screen 612 and provide a portal to communicate with the new acquaintance Jane Smith via the CIM application operated by the user John Doe. The contact information can be shared 614 and the prompt 616 may indicate that the information is based on the alias number not the user's actual assigned telephone number. The result may demonstrate that the information is shared successfully 618 to the new acquaintance and may be stored in a personal contact list.

Figure 6B:
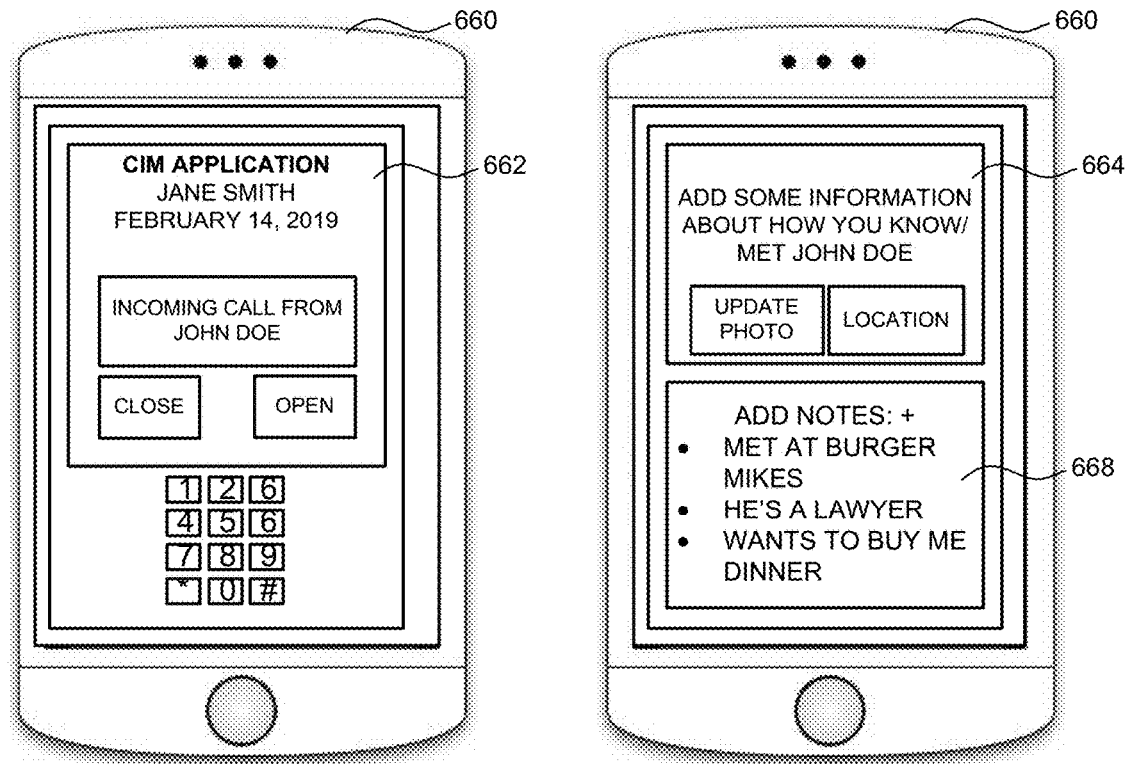
FIG. 6B illustrates an example user interface of a recipient accessing the CIM application and communicating between the originator and the recipient user device, according to example embodiments.

FIG. 6B illustrates an example user interface of a recipient accessing the CIM application and communicating between the originator and the recipient user device, according to example embodiments. Referring to FIG. 6B, in this example 650, the recipient device 660 may illustrate the incoming communication from the initiator 662, the CIM application may launch automatically and provide options, such as accept, close, open, etc., to provide a communication channel. The context of the relationship may also be updated 668 to include notes, such as a location, date, time, business relationship, etc., among the parties. Options to edit, add, remove information are available to provide reference information 664.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 7:
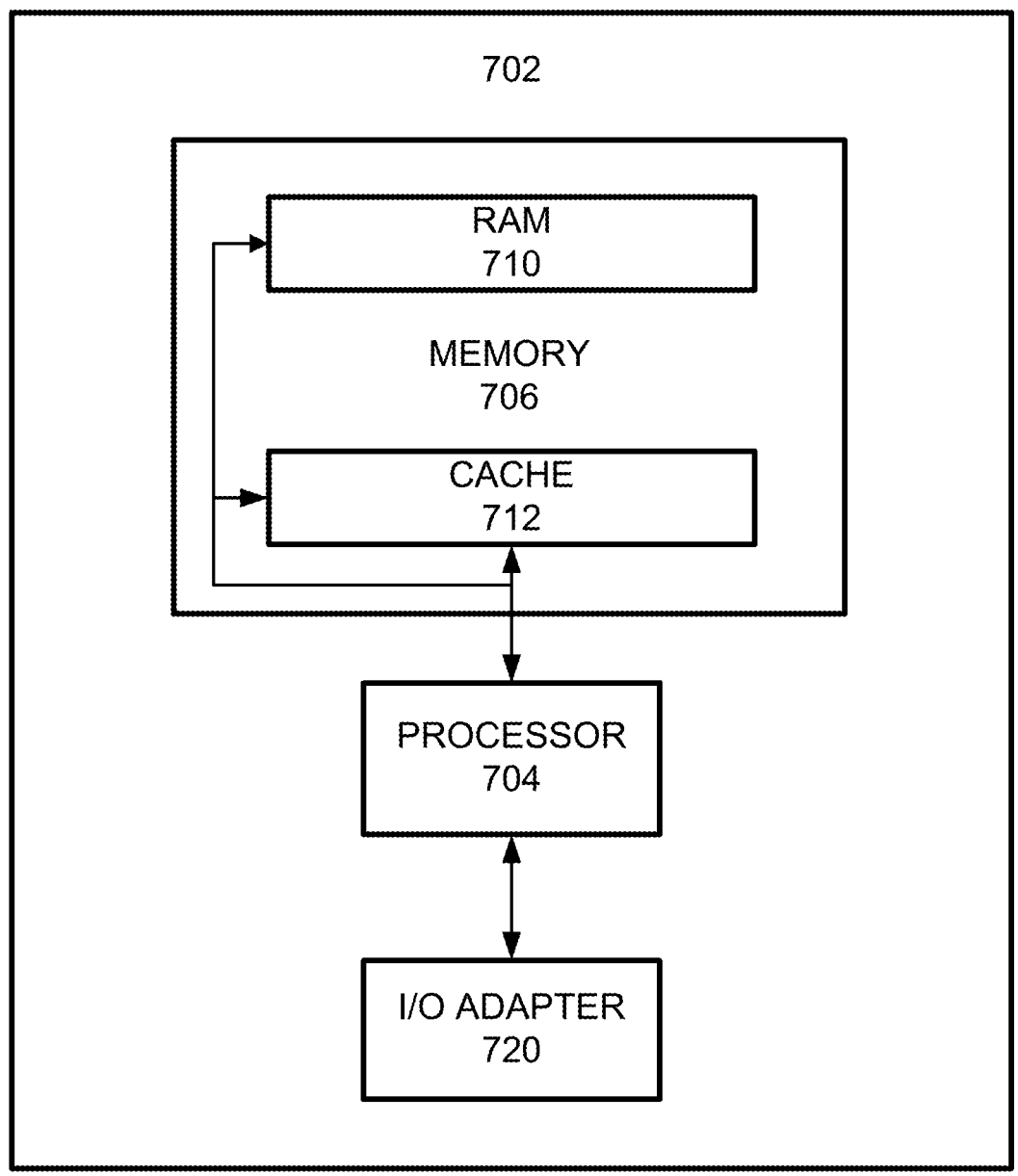
FIG. 7 illustrates an example computing platform that supports one or more of the example embodiments.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc. FIG. 7 is not intended to suggest any limitation as to the scope of use or functionality of embodiments of the application described herein.

In computing node 700 there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, a storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices, via a I/O adapter 720 such as a keyboard, a pointing device, a display, etc.; one or more devices that enable a user to interact with computer system/server 702; and/or any devices (e.g., network card, modem, etc.) that enable computer system/server 702 to communicate with one or more other computing devices. Such communication can occur via I/O interfaces 720. Still yet, computer system/server 702 can communicate with one or more networks such as a local area network (LAN), a general wide area network (WAN), and/or a public network (e.g., the Internet) via adapter 720.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   initiating a share operation, via a first mobile device, to share contact information with a second mobile device;
   identifying, via an application server, a first mobile device telephone number assigned to the first mobile device and a first alias telephone number to assign to the first mobile device, among available alias telephone numbers stored in a database associated with the application server;
   identifying, via the application server, a second mobile device telephone number assigned to the second mobile device and a second alias telephone number to assign to the second mobile device, among the available alias telephone numbers stored in the database associated with the application server;
   assigning the first alias telephone number to the first mobile device and the second alias telephone number to the second mobile device;
   creating a first association data identifier which includes the telephone number of the first mobile device and the first alias telephone number;
   creating a second association data identifier which identifies the telephone number of the second mobile device and the second alias telephone number;
   storing the association identifiers in the database associated with the application server;
   identifying a subsequent share operation sent via a third mobile device, the share operation being destined for a fourth mobile device;
   assigning a third alias telephone number to the third mobile device and a fourth alias telephone number to the fourth mobile device, wherein the fourth alias telephone number is the same as the second alias telephone number;
   creating a third association data identifier which includes the telephone number of the third mobile device and the third alias telephone number;
   creating a fourth association data identifier which identifies the telephone number of the fourth mobile device and the fourth alias telephone number; and
   storing the third and fourth association identifiers in the database, wherein the fourth association identifier identifies the fourth alias telephone number assigned to the fourth mobile device as being the same as the second alias telephone number assigned to the second mobile device, both of which are stored simultaneously in the database.

2. The method of claim 1, further comprising:
   identifying, at the application server, a communication request, from the second mobile device, which identifies the first alias telephone number;
   retrieving the association identifiers from the database;
   determining the first alias telephone number is assigned to the first mobile device; and
   establishing a communication session between the first mobile device and the second mobile device.

3. A system comprising:
   an application server;
   a first and second mobile device;
   wherein the first mobile device is configured to initiate a share operation to share contact information with the second mobile device;
   wherein the application server is configured to
      identify a first mobile device telephone number assigned to the first mobile device and a first alias telephone number to assign to the first mobile device, among available alias telephone numbers stored in a database associated with the application server;
      identify a second mobile device telephone number assigned to the second mobile device and a second alias telephone number to assign to the second mobile device, among available alias telephone numbers stored in a database associated with the application server; and
      assign the first alias telephone number to the first mobile device and the second alias telephone number to the second mobile device;
      create a first association data identifier which includes the telephone number of the first mobile device and the first alias telephone number;
      create a second association data identifier which identifies the telephone number of the second mobile device and the second alias telephone number;
      store the association identifiers in the database associated with the application server;
      identify a subsequent share operation sent via a third mobile device, the share operation being destined for a fourth mobile device;
      assign a third alias telephone number to the third mobile device and a fourth alias telephone number to the fourth mobile device, wherein the fourth alias telephone number is the same as the second alias telephone number;
      create a third association data identifier which includes the telephone number of the third mobile device and the third alias telephone number;
      create a fourth association data identifier which identifies the telephone number of the fourth mobile device and the fourth alias telephone number; and
      store the third and fourth association identifiers in the database, wherein the fourth association identifier identifies the fourth alias telephone number assigned to the fourth mobile device as being the same as the second alias telephone number assigned to the second mobile device, both of which are stored simultaneously in the database.

4. The system of claim 3, wherein the application server is further configured to
   identify a communication request, from the second mobile device, which identifies the first alias telephone number;
   retrieve the association identifiers from the database;
   determine the first alias telephone number is assigned to the first mobile device; and
   establish a communication session between the first mobile device and the second mobile device.

5. A non-transitory computer readable storage medium configured to store instructions that when executed cause a processor to perform:
   initiating a share operation, via a first mobile device, to share contact information with a second mobile device;
   identifying, via an application server, a first mobile device telephone number assigned to the first mobile device and a first alias telephone number to assign to the first mobile device, among available alias telephone numbers stored in a database associated with the application server;
   identifying, via the application server, a second mobile device telephone number assigned to the second mobile device and a second alias telephone number to assign to the second mobile device, among available alias telephone numbers stored in a database associated with the application server;

assigning the first alias telephone number to the first mobile device and the second alias telephone number to the second mobile device;

creating a first association data identifier which includes the telephone number of the first mobile device and the first alias telephone number;

creating a second association data identifier which identifies the telephone number of the second mobile device and the second alias telephone number;

storing the association identifiers in the database associated with the application server;

identifying a subsequent share operation sent via a third mobile device, the share operation being destined for a fourth mobile device;

assigning a third alias telephone number to the third mobile device and a fourth alias telephone number to the fourth mobile device, wherein the fourth alias telephone number is the same as the second alias telephone number;

creating a third association data identifier which includes the telephone number of the third mobile device and the third alias telephone number;

creating a fourth association data identifier which identifies the telephone number of the fourth mobile device and the fourth alias telephone number; and storing the third and fourth association identifiers in the database, wherein the fourth association identifier identifies the fourth alias telephone number assigned to the fourth mobile device as being the same as the second alias telephone number assigned to the second mobile device, both of which are stored simultaneously in the database.

6. The non-transitory computer readable storage medium of claim 5, wherein the processor is further configured to perform:

identifying, at the application server, a communication request, from the second mobile device, which identifies the first alias telephone number;

retrieving the association identifiers from the database;

determining the first alias telephone number is assigned to the first mobile device; and establishing a communication session between the first mobile device and the second mobile device.

* * * * *